United States Patent

Kawakami

[11] Patent Number: 5,888,666
[45] Date of Patent: Mar. 30, 1999

[54] SECONDARY BATTERY

[75] Inventor: Soichiro Kawakami, Nara, Japan

[73] Assignee: Canon Kabushiki Kaisha, Tokyo, Japan

[21] Appl. No.: 810,250

[22] Filed: Mar. 3, 1997

[30] Foreign Application Priority Data

Mar. 5, 1996 [JP] Japan .................................. 8-073079

[51] Int. Cl.$^6$ ...................................................... H01M 2/16

[52] U.S. Cl. .............................. 429/62; 429/145; 429/249

[58] Field of Search ............................. 429/62, 142, 144, 429/145, 190, 194, 229, 218, 248, 249

[56] References Cited

U.S. PATENT DOCUMENTS

| | | | |
|---|---|---|---|
| 5,006,428 | 4/1991 | Goebel et al. | 429/145 X |
| 5,453,333 | 9/1995 | Takauchi et al. | 429/62 |
| 5,698,339 | 12/1997 | Kawakami et al. | 429/212 |

Primary Examiner—Anthony Skarpars
Attorney, Agent, or Firm—Fitzpatrick, Cella, Harper & Scinto

[57] ABSTRACT

A secondary battery includes an anode, a cathode, an electrolyte, and a layer including communicating pores through which ions participating in a battery reaction can move between the anode side and the cathode side and whose sizes can change depending on environment. The electrolyte and the layer are disposed between the anode and the cathode. The battery also includes a battery housing for accommodating these components.

16 Claims, 5 Drawing Sheets

SECONDARY BATTERY

BACKGROUND OF THE INVENTION

1. Field of the Invention

This invention relates to a secondary battery, particularly, to a secondary battery which suppresses the generation of dendritic deposition in lithium metal or zinc metal during repetition of charging/discharging.

2. Description of the Related Art

Recently, an increase in the earth's temperature due to the greenhouse effect caused by an increase in the amount of $CO_2$ gas included in the atmosphere has been predicted. Since thermal power plants, which burn fossil fuel and convert obtained thermal energy into electric energy, discharge a large amount of $CO_2$ gas, it becomes more and more difficult to construct new thermal power plants. Accordingly, in order to effectively utilize electric power generated by generators, such as thermal power plants and the like, so-called load leveling has been proposed in which night power, serving as dump power, is stored in secondary batteries installed in general houses and is used during day time where electric power consumption is large to level the load.

In the field of electric vehicles having the feature of not emitting substances causing air pollution, such as COx, NOx, hydrocarbons and the like, the development of high-energy-density secondary batteries has been expected. In the field of power supplies for portable devices, such as book-size personal computers, word processors, video cameras, portable telephone sets and the like, the development of small, light and high-performance secondary batteries has been urgently requested.

As such small, light and high-performance secondary batteries, so-called "lithium-ion batteries" of a rocking-chair type, which use a lithium-intercalation compound in which lithium ions are deintercalated from between layers in reaction during charging as a cathode (a positive electrode) material, and a carbonous material such as graphite in which lithium ions can be intercalated between layers of a plane having the shape of a six-membered-ring network formed by carbon atoms as an anode (a negative electrode) material, have been developed and partially put into practical use.

In the "lithium-ion battery", however, since the anode made of a carbonous material can theoretically intercalate only ⅙ lithium atom per carbon atom at most, a high-energy-density secondary battery which utilizes with a lithium primary battery using metallic lithium as the anode material has not yet been realized. If it is intended to store a greater amount of lithium than an amount of lithium which can be intercalated between carbon layers of the anode during charging, dendritic lithium metal grows on the surface of the carbonous material to cause short circuit. Accordingly, a high-capacity secondary battery which stores a greater amount of lithium than an amount of lithium capable of being intercalated between layers has not yet been realized.

In high-capacity lithium batteries using metallic lithium as the anode, lithium dendrite which is a principal cause for internal-shorts is apt to be generated by repetition of charging/discharging. Since it is not easy to suppress the growth of such lithium dendrite, it is difficult to provide lithium secondary batteries.

Although lithium secondary batteries using a metal, such as lithium metal, aluminum or the like, as the anode, in which lithium metal is deposited during charging and high energy density can be expected, have been studied, such batteries do not yet have a sufficient life so as to be practically used.

In secondary batteries using a carbonous material for the anode or secondary batteries using an anode where lithium metal is deposited during charging, when lithium dendrite grows to provide a state of internal-shorts between the anode and the cathode, the battery is heated by consumption of the energy of the battery during a short time period, and the solvent of the electrolyte solution is thereby decomposed to generate a gas and increase the internal pressure, thereby, in some cases, damaging the battery. In order to secure safety for lithium secondary batteries including the above-described lithium ion batteries (secondary batteries which utilize the oxidation-reduction reaction of lithium ions will be hereinafter generically termed "lithium secondary batteries"), an attempt has been made in which a porous film made of polyethylene or polypropylene having a melting point of 120° C.–170° C. is used for the separator between the cathode and the anode, and the separator melts when the internal temperature rises to the melting point of the material due to internal-shorts of the battery caused by some reason, to fill pores and thereby to electrically insulate the anode from the cathode and stop the battery reaction. Although this approach functions as a safety precaution for an emergency, this is not a complete solution for drastically increasing the life of the anode of a lithium secondary battery.

In the above-described lithium secondary batteries using a porous film made of an organic polymer as the separator, the battery operates only when the temperature is equal to or higher than 120° C., and the function of the battery having the separator whose pores have been filled with the melted organic polymer does not recover even if the temperature decreases because the state of insulation between the cathode and the anode remains. Accordingly, it is desired to develop means for realizing a high battery capacity, and suppressing the growth of lithium dendrite during charging and thereby increasing the cycle life of the battery.

In secondary batteries such as nickel-zinc batteries or air-zinc batteries, as in lithium secondary batteries, the dendritic deposition of zinc metal is liable to be produced due to the repetition of charging/discharging and threads through the separator to cause internal-shorts between the zinc anode and the cathode, thereby shortening the cycle life.

Accordingly, in lithium secondary batteries and zinc secondary batteries, it is strongly desired to develop a battery having a sufficient cycle life and high capacity.

SUMMARY OF THE INVENTION

The present invention has been made in consideration of the above-described problems.

It is an object of the present invention to provide a secondary battery, whose anode active material comprises lithium or zinc, having a long cycle life and a high energy density.

According to one aspect, the present invention which achieves the above-described object relates to a secondary battery including an anode, a cathode, an electrolyte, and a layer including communicating pores through which ions participating in a battery reaction can move and whose pore sizes can change depending on environment, the electrolyte and the layer being provided between the cathode and the anode. The battery also includes a battery housing for accommodating these components.

Ions participating in a battery reaction are ions participating in or generated during, an oxidation-reduction reaction in a charging/discharging reaction of the secondary battery.

DETAILED DESCRIPTION OF THE PREFERRED EMBODIMENTS

Figure 1:
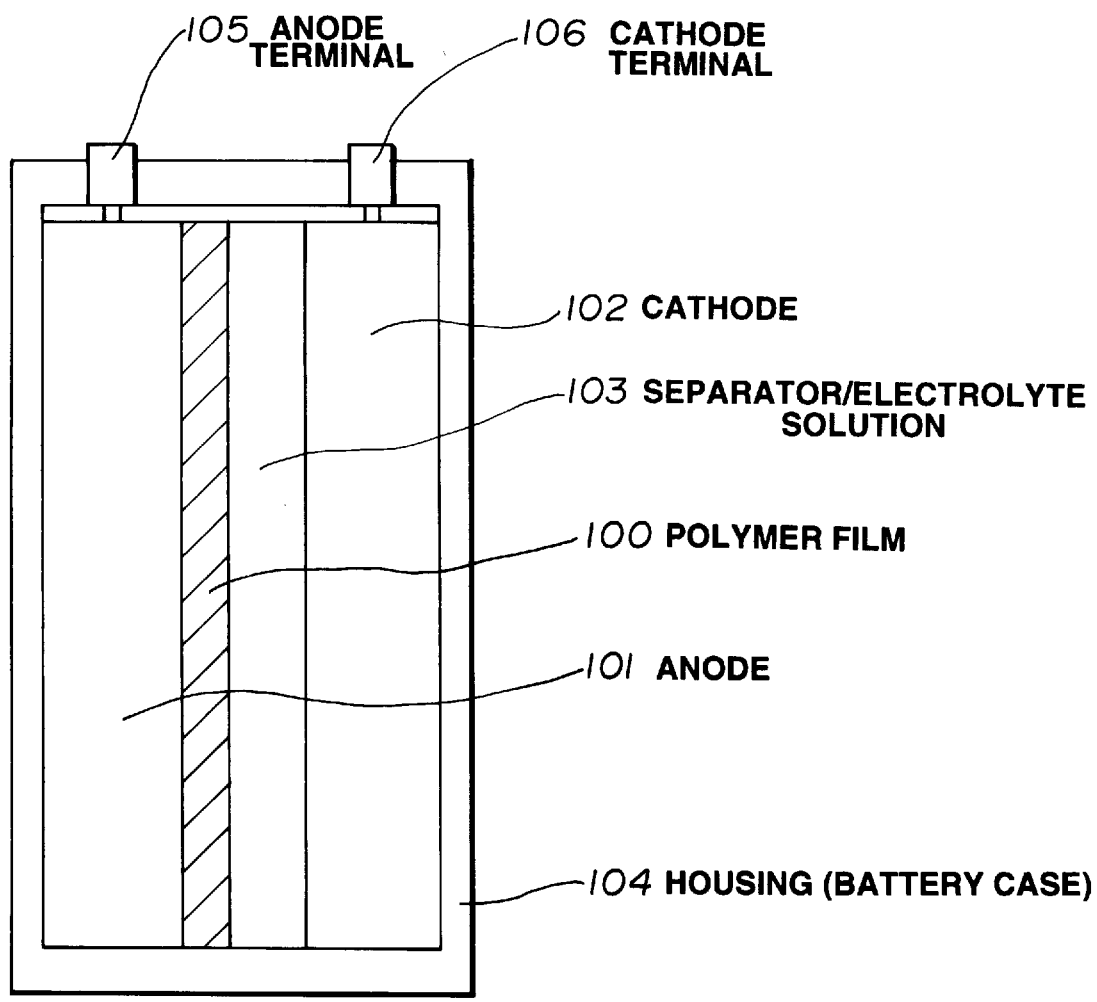
FIG. 1 is a cross-sectional view illustrating the configuration of one embodiment of a secondary battery according to the present invention.

A secondary battery according to the present invention has a feature in that a layer provided between a cathode (a positive electrode) and an anode (a negative electrode) has communicating pores through which ions participating in a battery reaction can move and whose pore sizes (i.e., width of the pore/diameter of the pore) can change depending on environment. "The communicating pore" is one which communicates between the anode side and the cathode side in the secondary battery. The ion participating in a battery reaction can move via the pore between the anode side and the cathode side. The pore sizes of such communicating pores change in accordance with changes in the voltage and the temperature in the vicinity of their positions between the cathode and the anode, thereby changing the resistance of the communicating pores between the cathode and the anode. For example, in the battery reaction, when the voltage is locally high and/or the temperature is locally high in the vicinity of the communicating pores, the pore sizes of the communicating pores decrease, so that the resistance in the vicinity of the communicating pores increases to suppress the rate of the battery reaction.

In a charging reaction of the secondary battery, for example, due to nonuniformity in the shapes of surfaces and the compositions of the cathode and the anode, a high electric field is, in some cases, locally produced between the cathode and the anode, thereby causing a high rate of reaction. As a result, the above-described dendritic anode active material, in some cases, grows depending on the materials and the reaction mechanism of the battery, and the possibility of internal-shorts between the cathode and the anode thereby increases. By configuring the region between the cathode and the anode of the battery with communicating pores whose pore sizes change so as to increase the resistance in the vicinity of a portion where the electric field and/or the temperature increases, it is possible to suppress the rate of the battery reaction and thereby to prevent internal-shorts between the cathode and the anode.

In the secondary battery of the present invention, a high energy density can be expected and the growth of the above-described dendrite is suppressed. Preferably, the battery includes one containing at least a lithium element (a lithium secondary battery) in the anode during charging or one containing at least a zinc element (a zinc secondary battery) in the anode during charging.

In the secondary battery of the present invention, the layer between the cathode and the anode includes pores. It is preferable that the layer comprises a polymer film, and the diameters of pores decrease at a portion where the intensity of the electric field and/or the temperature is higher than surrounding portions.

The polymer film preferably comprises at least a polymer liquid crystal or a composite of a polymer and a liquid crystal. It is preferable that the liquid crystal portion of the polymer film is oriented vertically or obliquely relative to the plane of the anode when no voltage is applied, and is oriented in parallel or disorderly relative to the plane of the anode to reduce the length (size) of the pore portion in the direction of the plane of the anode when a high electric field is locally applied or the temperature rises during charging at a portion where the growth of dendrite of the active material is apt to occur. The polymer liquid crystal or the liquid crystal of the polymer film preferably comprises at least a liquid crystal having negative dielectric-constant anisotropy.

The polymer film preferably comprises at least a polymer gel.

According to detailed investigation of the inventor of the present invention on portions and conditions where the growth of lithium dendrite occurs during charging of a lithium secondary battery using lithium metal, aluminum or a carbonous material for the anode, lithium dendrite is apt to grow at portions where the intensity of the electric field is high, such as projections on the surface of the anode, and these portions are heated due to the passage of a large current. The same result is obtained also for nickel-zinc secondary batteries and air-zinc batteries using zinc for the anode. Based on this result of the investigation, the inventor has found a method for selectively increasing the resistance of these portions, and has confirmed that the growth of dendrite of lithium or zinc is suppressed during charging.

In secondary batteries, whose anode active material comprises lithium or zinc, according to the present invention, by providing a layer including communicating pores whose sizes between the anode and the cathode decrease at portions where the intensity of the electric field is high, such as projections or the like, on the surface of the anode to increase the resistance, internal-shorts between the anode and the cathode can be prevented. Thus, the growth of dendrite of lithium or zinc during charging can be suppressed. As a result, the cycle life during charging/discharging can be greatly increased. It is thereby possible to realize a secondary battery having a long cycle life and a high energy density.

In the present invention, the "active material" indicates a material generated during, or participating in (repetition of) an electrochemical reversible reaction of charging/discharging in a battery, and includes a material which is generated during, or participates in such a reaction and also holds another material is generated during, or participating in the reaction. In lithium secondary batteries, lithium is held at the anode side during charging as a anode active material, and is dissolved in the electrolyte solution to provide lithium ions during charging. In zinc secondary batteries, zinc, serving as an anode active material, reacts on hydroxide ions and is converted into zinc hydroxide or zinc oxide during charging.

A description will now be provided of an embodiment of the present invention with reference to FIGS. 1, 2(a)–2(c), and 5.

FIG. 1 is a schematic cross-sectional view illustrating an embodiment of a secondary battery according to the present invention. In the secondary battery shown in FIG. 1, an anode (negative electrode) 101 faces a cathode (positive electrode) 102 via a separator 103 holding an electrolyte solution, and a porous polymer film 100, serving as a layer including communicating pores through which ions generated during battery operation, or participating in the battery reaction can move and whose sizes change depending on environment, in particular, whose sizes decrease at a region where the intensity of the electric field or the temperature is locally high to increase the resistance, which is a feature of the present invention, is provided between the anode 101 and the cathode 102. The porous polymer film 100 has the function that ions generated during battery operation, or paticipating in the battery reaction can pass therethrough, but pores narrow at a portion where a high electric field is applied or the temperature rises to control the passage of ions participating in the battery reaction and to restrict the passage of metal deposited during charging and thereby to increase the resistance.

Figure 5:
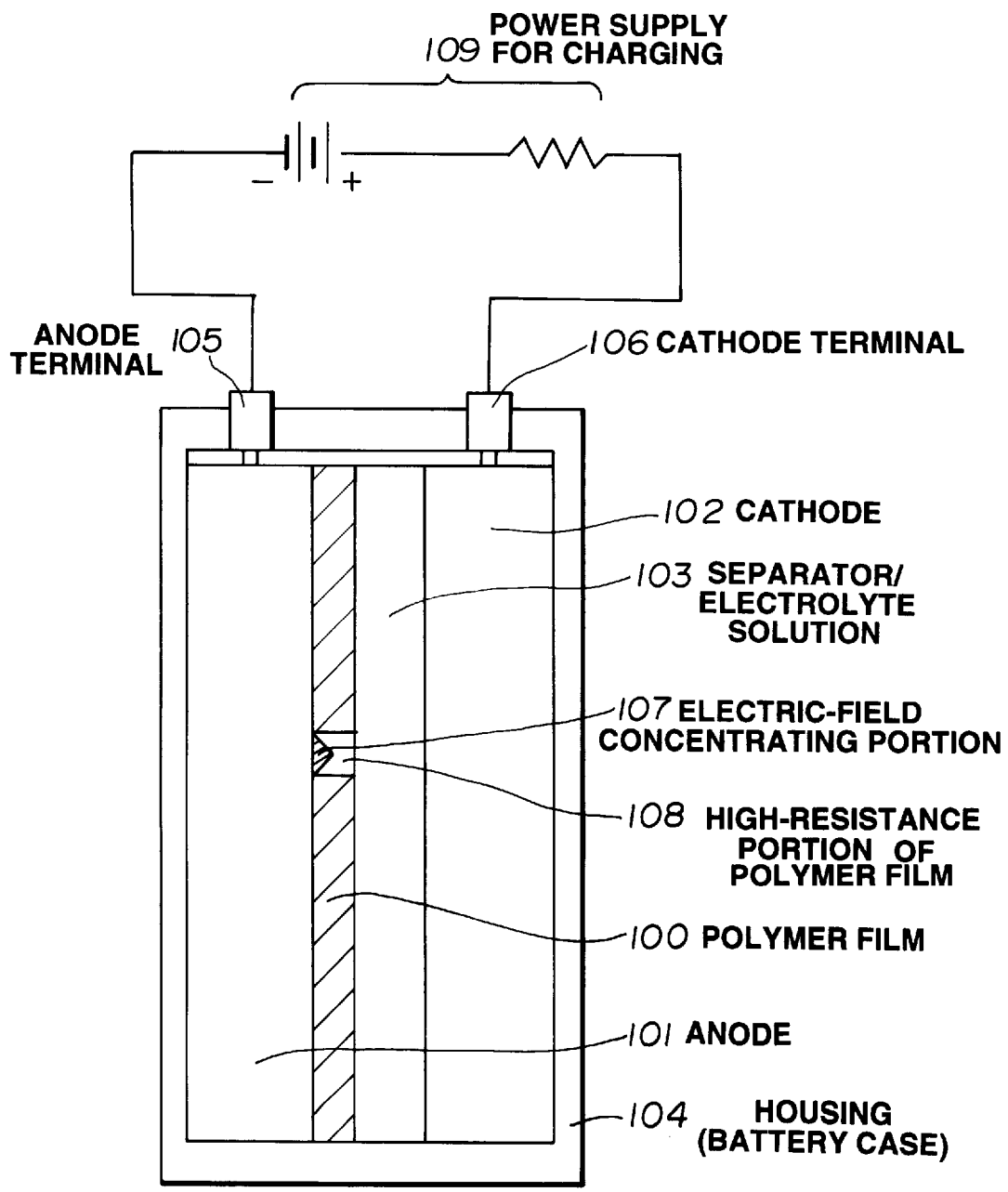
FIG. 5 is a schematic diagram illustrating the function of a secondary battery according to the invention.

This function will be described with reference to FIG. 5. FIG. 5 is a schematic diagram illustrating the function of the secondary battery of the present invention, and illustrates a case in which the secondary battery is charged by connecting a DC power supply thereto. When an electric-flux line concentrating portion 107, where the intensity of the electric field is high, such as a projection, is present on the surface of the anode of the secondary battery, an electric field which is higher than that of surrounding portions is applied to the portion 107, thereby increasing the current density to heat that portion. At that time, a portion 108 of the polymer film 100 where the high electric field is applied to raise the temperature, pores narrow to increase the resistance. As a result, deposition of a dendritic anode active material during charging is suppressed at the portion 107 where the high electric field is applied on the surface of the anode, and internal-shorts between the anode and the cathode are suppressed.

Figure 2A:
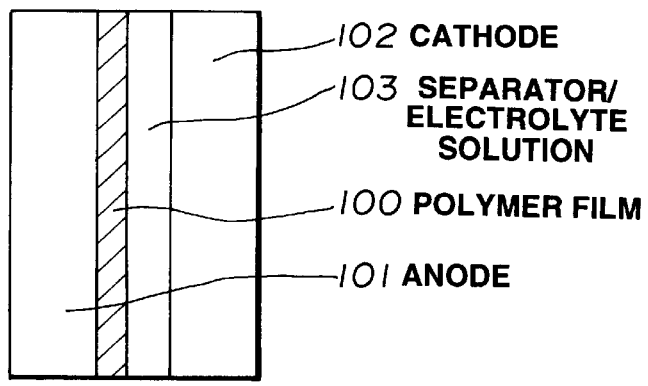
FIGS. 2(a)–2(c) are schematic diagrams each illustrating the arrangement of an anode, a cathode, a separator, and a polymer film, serving as means for preventing the growth of dendrite of an anode active material, within a secondary battery according to the invention.
Figure 2B:
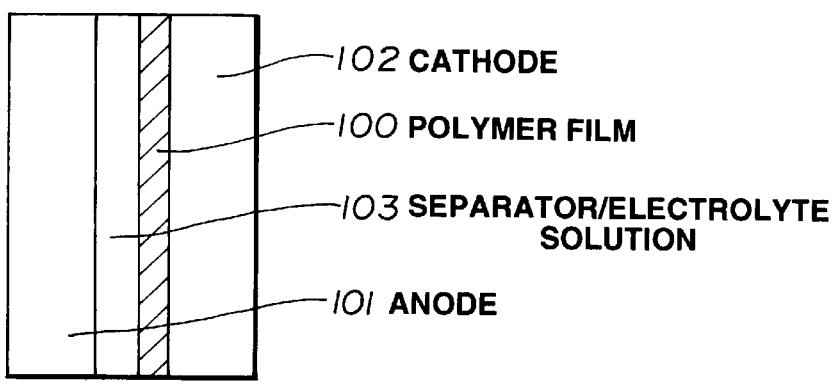
Figure 2C:
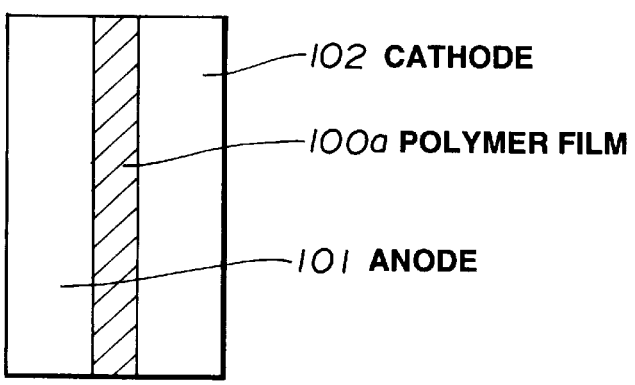

FIGS. 2(a)–2(c) are schematic diagrams each illustrating an example of the arrangement of the anode 101, the cathode 102, the separator/electrolyte solution 103, and the porous polymer film 100, serving as means for preventing the growth of a dendritic anode active material, shown in the cross section of the secondary battery in FIG. 1. In FIG. 2(a), the polymer film 100 is provided between the anode 101 and the separator 103. In FIG. 2(b), the polymer film 100 is provided between the cathode 102 and the separator 103. In FIG. 2(c), a polymer film 100a, which also operates as the separator 103, is provided between the anode 101 and the cathode 102.

The secondary battery of the present invention includes at least a cathode, an anode, a layer having the above-described communicating pores, more specifically, a porous polymer film, provided between the cathode and the anode, an electrolyte, a separator and a housing. A description will now be provided of each of these components.

Polymer Film

The porous polymer film (the film 100 in the case of FIG. 1), serving as a layer, including communicating pores through which ions participating in the battery reaction can pass and whose sizes can change depending on environment, for preventing the growth of a dendritic anode active material during charging, which is a feature of the present invention, provided between the anode and the cathode must have pores through which ions participating in the battery reaction can pass and whose diameters narrow when a high electric field is applied or the temperature rises. For example, a liquid crystal polymer, a composite of a polymer, serving as a base material, and a liquid crystal, or a polymer gel may be used as the material for the polymer film. A liquid crystal whose longer molecular axis is aligned in perpendicular to the electric field when the electric field is applied is preferable as the liquid crystal polymer, or the liquid crystal of the composite of the polymer, serving as the base material, and the liquid crystal as the material for the polymer film. The liquid crystal preferably has negative dielectric-constant anisotropy. By aligning the longer molecular axis of the liquid crystal portion of the polymer film in perpendicular to the electric field, pores (pore size) which thread in a direction parallel to the electric field (the above-described communicating pores) narrow.

In the polymer gel constituting the polymer film, it is preferable that volume expansion of at least 20% occurs due to temperature rise. Pores narrow by the volume expansion. When providing the polymer gel at the anode side, the polymer gel is preferably a cationic polymer gel having positive charges. Lithium cations gather in the vicinity of the surface of the anode during charging, and the cationic polymer gel expands by extending molecules in order to maintain the condition of neutralization. When providing the polymer gel at the cathode side, the polymer gel is preferably an anionic polymer gel having negative charges. Anions gather in the vicinity of the surface of the cathode during charging, and the anionic polymer gel expands by extending molecules in order to maintain the condition of neutralization.

As described above, by narrowing pores of the polymer film, which is a feature of the secondary battery of the invention, when a high electric field is locally produced in the vicinity of the pores and/or when the temperature locally rises in the vicinity of the pores, ions participating in the battery reaction or an anode active material deposited during charging are prevented from passing through pores of the polymer film and the separator to reach the cathode, thereby preventing internal-shorts.

Pores formed in the polymer film may have diameters sufficient to pass ions participating in the battery reaction, i.e., usually equal to or less than 1 μm, and preferably 2–1,000 Å.

The pores of the polymer film narrow when a high electric field is applied or the temperature rises. The ratio of contraction of the diameters of the pores may be within a range to provide the function of increasing the resistance when ions move, i.e., usually at least 10% of the original diameters of the pores, and preferably 20–98%.

When adopting the above-described polymer film particularly in a lithium secondary battery, it is necessary to sufficiently remove water in the film, for example, by drying under reduced pressure at least before assembling the polymer film in the battery and pouring the electrolyte solution into the battery. If dehydration is insufficient, remaining water reacts on lithium deposited during charging to form a lithium compound, such as lithium hydroxide or the like, which cannot be utilized during discharging, thereby reducing the amount of discharge current.

The porous polymer film having communicating pores is formed using a polymer liquid crystal material according to a casting method using a solution obtained by dissolving the polymer liquid crystal material in a solvent, or by directly coating the material on the surface of the anode, the separator or the cathode. The solvent is removed by drying the film to produce pores. Alternatively, the polymer film may be simultaneously formed at a polymerization reaction using a monomer from which the polymer liquid crystal is obtained by the polymerization reaction. In some cases, in order to adjust the distribution of pores, the film is formed by adding a substance (e.g. electrolyte) which can be extracted and removed while forming the film, and extracting and removing the added substance to adjust the distribution of pores.

Pores are formed by adding a substance which can be removed afterwards to an amount so as to provide a desired porosity ratio while forming the polymer film, adding a solvent if necessary, and removing the removable substance while the film is formed or after the film has been formed. A substance which can be dissolved, such as an electrolyte used for an electrolyte solution, or an organic solvent, may be used as the removable substance. When using an electrolyte as the removable additive substance, the influence on the characteristics of the battery is very little. Altenatively, the removable substance may be heated, or evaporated or decomposed under reduced pressure, or a solvent having a low boiling point which is uniformly mixed with a solvent to be removed may be used.

In order to improve the dissolution stability with respect to the electrolyte solution after forming the film, the film may be cross-linked in a cross-linking reaction. The cross-linking reaction may be produced by adding a cross-linking agent while the film is formed, or by irradiating the film with ultraviolet rays or radiation after the film has been formed.

The porous polymer film having communicating pores is formed using a composite of a polymer material and a liquid crystal material according to a casting method in which the liquid crystal material is mixed in a polymer solution obtained by dissolving the polymer material, serving as a base material, in a solvent, and the obtained mixture solution is casted on a rotating flat and uniform metallic substrate to provide the film, or by directly coating the surface of the anode, the separator or the cathode with the material and then removing the solvent by drying the obtained film. In some cases, as in the above-described case of forming the polymer liquid crystal film, in order to adjust the distribution of pores, the polymer film may be formed by adding an additive substance which can be removed afterwards, such as an electrolyte. Furthermore, it is preferable to cause a cross-linking reaction after forming the film because the stability of the film with respect to the electrolyte solution is improved. The same cross-linking method as for the above-described polymer liquid crystal film may be adopted.

In the secondary battery of the present invention, it is preferable that the liquid crystal of the polymer liquid crystal film or the composite film of the polymer and the liquid crystal described above, serving as the polymer film used as the layer, having communicating pores whose size can change depending on environment, provided between the cathode and the anode, is oriented perpendicularly or obliquely relative to the plane of the anode during film formation. The liquid crystal may be oriented by applying a magnetic field or an electric field in parallel, perpendicularly, or obliquely relative to the plane of the anode before the polymer film solidifies. Alternatively, the liquid crystal may be oriented, for example, by applying a stress to the film containing liquid crystal, performing orientation treatment of the surface of the substrate for forming the film, heating or cooling the substrate, the selection of an optimum solvent and an optimum concentration for preparing the film. More specifically, vertical orientation treatment on the surface of the substrate is performed by the physical adsorption of amphipathic molecules of p-(octyloxy)-p'-hydroxyazobenzene, dimethylhexadecyl ammonium bromide, N-[11-bromoundecanoyl]-L-glutamate didodecyl ester, hexadecyltributyl phosphonium bromide, stearyltributyl phosphonium bromide, lecithin, cetyltrimethyl ammonium bromide or the like, or the chemical adsorption of an organic-metal coupling agent, such as steryl trichlorosilane or the like. The oblique orientation treatment may be performed by obliquely depositing a metal or an organic polymer on the surface of the substrate by sputtering or, vacuum deposition, such as electron-beam vacuum deposition or the like.

On the other hand, the porous polymer film having communicating pores is formed using a polymer gel material by (a) forming the polymer gel from a monomer by direct polymerization and a cross-linking reaction, or forming the polymer gel by causing a cross-linking reaction after forming a polymer, (b) forming the polymer gel by causing a cross-linking reaction after immersing the separator in a solution of a monomer, or forming the polymer gel by causing a cross-linking reaction after immersing the separator in a solution of a polymer, (c) first forming the powder of the polymer gel from a monomer by polymerization and a cross-linking reaction, and then dispersing the power of the polymer gel in a solution of a polymer and solidifying the solution, (d) forming the polymer gel by a cross-linking reaction after performing casting of a solution of a polymer on the surface of the anode, the cathode or the separator, or forming the polymer gel by causing a polymerization reaction and a cross-linking reaction after performing casting of a monomer solution. The thickness of the polymer gel may be adjusted when forming the gel by polymerization or cross-linking, or may be adjusted to a uniform value by press working after forming and drying a film. The thickness of the polymer gel may be adjusted by the kind and the concentration of the solvent, the depth of the reaction receptacle, or the like when the film is formed. The coefficient of expansion of the polymer gel may be adjusted by the kind of the monomer, the degree of polymerization, the degree of cross-linking, the kind and the concentration of the solvent, the concentration of the electrolyte contained in the solvent, or the like.

The film or the sheet of the porous polymer formed by the polymer liquid crystal, the composite of the polymer and the liquid crystal, or the polymer gel described above may be formed by a casting method (a liquid spin coating method) in which a polymer solution obtained by dissolving the polymer material in a solvent is subjected to casting on a rotating flat and uniform metallic substrate to provide a film, an extrusion method in which a polymer liquid melted by heat is extruded from a T-shaped die to provide a film, or a calender method in which a polymer substance is rolled between at least two rolls to provide a film. In the extrusion method, a polymer before cross-linking is used, and a polymer film is obtained by causing a cross-linking reaction after forming a film of the polymer before cross-linking. In the calender method, a film is formed using a dried polymer.

Liquid Crystal Material

A thermotropic material which provides a liquid crystal layer when it melts or a lyotropic material which shows the property of a liquid crystal in a solvent may also be used as the liquid crystal material, serving as the polymer liquid crystal or the liquid crystal of the composite of the polymer and the liquid crystal described above which forms the porous polymer film. Nematic liquid crystals, cholesteric liquid crystals, smectic liquid crystals, discotic liquid crystals, ferroelectric liquid crystals showing spontaneous polarization, and the like may be used as liquid crystals having various kinds of orientation. It is preferable to use a liquid crystal having negative dielectric-constant anisotropy, and more preferable to use a liquid crystal showing a nematic liquid crystal phase or a cholestric liquid crystal phase. It is also preferable that the liquid crystal is oriented vertically or obliquely relative to the plane of the anode when no voltage is applied, and is oriented in pallel or disorderly relative to the plane of the anode at a portion where a high electric field is locally applied during charging to raise the temperature and to facilitate the growth of a dendritic active material. It is also preferable to blend a plurality of liquid crystals so as to operate within the operating temperature range of the secondary battery. Perpendicular or oblique treatment is subjected to the plane of the anode of the secondary battery so that the orientation (perpendicularly or obliquely relative to the plane of the anode) of the liquid crystal in the initial state is determined. In this initial state, tilted angle of the liquid crystal molecule to the plane of the anode is preferably 45° or more.

2,3-difluorobenzene derivatives, pyridazine derivatives, fluorinated hydroquinone cyclohexane carboxylic ester compounds, fluorinated tolane compounds, cyanobenzene carboxylic ester compounds, cyan cyclohexane compounds and the like are used as the above-described liquid crystal materials showing negative dielectric-constant anisotropy used in the present invention. Among these materials, 3,6-2 substituted-1,2-dicyanobenzenes, 3,6-2 substituted pyridazines, 3,6-2 substituted-1, 2-difluorobenzenes, 3,6-2 substituted-1-cyanobenzenes, 1,4-2 substituted-1-cyanocyclohexanes and the like have relatively large negative dielectric-constant anisotropy.

The liquid crystal polymer used in the present invention has the structure of a main-chain-type polymer wherein meso-gen groups which are linear conjugate atomic groups, or meso-gen groups and alkyl chains or oxyethylene chains are linearly bonded alternately, or the structure of a side-chain-type polymer wherein meso-gen groups are bonded to main chains as side chains directly or via alkyl chains. Benzylideneaniline, azobenzene, azoxybenzene, stilbene, phenylbenzoate, benzoylaniline, biphenyl, benzylideneacetophenone, benzylideneazine and the like include meso-gen groups.

Polymer Gel

A polymer gel as the material for the porous polymer film, serving as means for preventing internal short circuit, of the lithium secondary battery of the present invention is preferably a polymer having a three-dimensional network structure which is insoluble in a solvent, or a material which swells by absorbing a solvent. As such polymer gels, polyacrylamide, N, N-diethylacrylamide polymers, N-isopropylacrylamide polymers, N-isopropylacrylamide-sodium acrylate copolymers, N,N-diethylacrylamide-sodium acrylate copolymers, acrylamide-(methacrylamidepropyl) trimethyl ammonium chloride copolymers, acrylamide-trimethyl (N-acryloyl-3-aminopropyl) ammonium iodide copolymers, polystyrene, styrene-styrene sulfonate copolymers, polyvinyl methyl ether, polyvinyl alcohol-polyacrylic acid composite gels, polyacrylic acid, polymethacrylic acid, methacrylic acid-2-hydroxyethyl, cellulose, polyethylene glycol, polyethylene oxide, polyvinyl alcohol, and the like may be used. From among these materials, polymer gels having ion dissociation groups, such as N-isopropylacrylamide-sodium acrylate copolymers, N, N-diethylacrylamide-sodium acrylate copolymers, acrylamide-(methacrylamidepropyl) trimethyl ammonium chloride copolymers, acrylamide-trimethyl (N-acryloyl-3-aminopropyl) ammonium iodide copolymers, styrene-styrene sulfonate copolymers and the like are preferably used. Polymer gels in which polymer chains contract at the room temperature, such as polyacrylamide and N,N-diethylacrylamide polymers, are also preferably used in the present invention because these materials swell at a high temperature.

The polymer gels which can be used in the present invention are formed, for example, by chemical bond or intermolecular bond. As methods for forming a gel by chemical bond, there are a method of performing cross-linking during a polymerization reaction, and a method of performing cross-linking after polymerization. As methods for performing cross-linking between polymer chains by intermolecular bond, there are cross-linking by hydrogen bond, cross-linking by ionic bond, and cross-linking by coordinate bond.

As forming methods by cross-linking, there are the formation of a cross-linking structure by condensation polymerization of a divinyl compound, a multifunctional compound or the like, simultaneous execution of polymerization and cross-linking using the energy of heat, light, radiation, plasma or the like, and cross-linking after synthesizing a straight-chain polymer.

As methods for performing cross-linking during a polymerization reaction, there are polymerization by a radical starting agent using ethylene glycol dimethacrylate or methylene bisacrylamide as a cross-linking agent, radiation polymerization by irradiation of a gamma-ray or an electron ray, a photo polymerization by irradiation of light having a wavelength equal to an absorption wavelength for a vinyl monomer in the presence of a cross-linking agent or by irradiation of light while adding a photosensitizer, and the like.

As methods for performing cross-linking between polymer chains afterwards, there are a method of performing cross-linking of cellulose or polyvinyl alcohol having hydroxyl groups by a chemical reaction of aldehyde, a N-methylol compound, dicarboxylic acid, bisepoxide or the like, a method of performing gelation of a polymer having amino acid by aldehyde or glycidyl groups, a method of performing cross-linking of polyvinyl alcohol or polymethylvinyl ether in water by irradiation of a gamma-ray or the like, a method of performing cross-linking of polyvinyl alcohol or N-vinylpyrolidone by a photo cross-linking agent, such as a diazo resin, bisazide, a bichromate or the like, a method of performing dimerization of a polymer having photosensitive groups, such as a stilbasorium salt or the like, and a wafer-soluble polymer, such as polyvinyl alcohol or the like, a method of performing cross-linking by making a plasma generated by discharge in a gas in contact with a polymer material, and the like.

A gel may, for example, be formed by hydrogen bond or ionic bond between polymers, or formation of a chelate. Hydrogen bond may be formed between polymers according to a freeze vacuum drying method, a freeze thawing method or the like. A gel may also be formed by mixing two different kinds of polymers, such as polymethacrylic acid and polyethylene glycol, or polyacrylic acid and polyvinyl alcohol. A polyion complex gel may be formed by mixing polycations, such as polyvinylbenzyl trimethyl ammonium or the like, and polyanions, such as sodium polystyrene sulfonate or the like. A polycarboxylic acid, such as polyacrylic acid or the like, or a strong-acid polymer, such as polystyrene sulfonate or the like, may be bonded to an alkali or an alkaline earth metal to form a gel.

Anode

As the material for the anode of the secondary battery of the present invention (the anode 101 in the case of FIG. 1), a material containing a lithium element (in case of a lithium secondary battery) or a zinc element (in case of a zinc secondary battery) during charging is preferably used. By forming (i.e., shaping) the anode material on the collector, the anode is obtained.

As the anode material for the lithium secondary battery, a material where lithium is deposited or intercalated, such as lithium metal, a carbonous material including graphite, a metallic material, a transition-metal compound or the like, may be used. For example, a metallic material which forms an alloy with lithium, such as aluminum or the like, or a metal which has pores for receiving deposited lithium and also operates as a collector, such as porous nickel or the like, is suitable as the above-described anode material.

The anode material having the shape of a foil or a plate can be used without being modified. If the anode material is in the form of powder or fibers, the anode is formed by preparing a paste-like coating agent by mixing the material in a binder, adding a conductive auxiliary material if necessary, and forming a coated film on the collector. A thin film of the anode material on the collector may also be formed by plating or a vapor deposition method. CVD (chemical vapor deposition), electron-beam deposition, sputtering or the like may be adopted as the vapor deposition method. Any anode for a lithium secondary battery must be sufficiently dried at a reduced pressure before being incorporated in the battery.

A zinc foil or plate, a zinc film plated or deposited in vacuum on the collector, a coated film of a substance obtained by mixing zinc oxide powder or zinc powder and zinc-oxide power in a binder (with a conductive auxiliary material if necessary) may be used as the anode material for a zinc secondary battery.

Cathode

The cathode of the secondary battery in the present invention (the cathode 102 in the case of FIG. 1) comprises a collector, a cathode active material, a conductive auxiliary material, a binder and the like. The cathode is provided by forming a mixture of the cathode active material, the conductive auxiliary material, the binder and the like on the surface of the collector.

For example, graphite, carbon black, such as Ketjen black, acetylene black or the like, metallic fine powder made of nickel or the like, may be used as the conductive auxiliary material used in the cathode.

For example, polyorefin, such as polyethylene, polypropylene or the like, a fluororesin, such as polyvinylidene fluoride, a tetrafluoroethylene polymer or the like may be used when the electrolyte solution comprises a nonaqueous solvent, or an aqueous solution and polyvinyl alcohol, cellulose, polyamide or the like may be used when the electrolyte solution comprises an aqueous solution, as the binder for the cathode.

In lithium secondary batteries using lithium as the anode active material, a transistion-metal oxide, a transition-metal sulfide, a lithium-transition-metal oxide or a lithium-transition-metal sulfide is generally used as the cathode active material. For example, an element partially having d-shell or f-shell electrons, such as Sc, Y, a lanthanoide-series element, an actinoide element, Ti, Zr, Hf, V, Nb, Ta, Cr, Mo, W, Mn, Tc, Re, Fe, Ru, Os, Co, Rh, Ir, Ni, Pd, Pt, Cu, Ag or Au, may be used as the transition-metal element for the transition-metal oxide or the transition-metal sulfide. Particularly, a first-transition-series metal, such as Ti, V, Cr, Mn, Fe, Co, Ni or Cu, is preferably used.

In nickel-zinc secondary batteries using zinc the an anode active material, nickel hydroxide is used as the cathode active material.

In air-zinc secondary batteries using zinc as the anode active material, oxygen is used as the cathode active material, and the cathode comprises a collector, a catalyst and a water repellent material. For example, porous carbon, porous nickel, copper oxide or, nickel oxide is used as the catalyst. A fluororesin, such as a porous tetrafluoroethylene polymer or polyvinylidene fluoride, is used as the water repellent material.

In zinc-bromine secondary batteries using zinc the an anode active material, bromine is used as the cathode active material.

Collector of the Anode and the Cathode

The collector used for the anode and the cathode of the secondary battery in the present invention has the role of efficiently supplying current consumed in the electrode reaction during charging and collecting generated current during discharging. Accordingly, a material which has a high electric conductivity and which is inert in the battery reaction is preferable as the material for forming the collector of the anode and the cathode.

Nickel, titanium, copper, aluminum, stainless steel, platinum, palladium, gold, zinc, each kind of alloy, a composite metal including at least two of the above-described materials is preferably used. The collector may have the shape of a plate, a foil, a mesh, a sponge, fibers, a punching metal, an expanded metal or the like.

Separator

The separator used in the present invention (the separator 103 in the case of FIG. 1) is disposed between the anode and the cathode and has the role of preventing short circuit between the anode and the cathode. It also has, in some cases, the role of holding the electrolyte solution.

The separator has pores where lithium ions or hydroxyl ions can move, and must be insoluble in the electrolyte solution and be stable. Accordingly, for example, glass, polyolefin, such as polypropylene, polyethylene or the like, a fluororesin, polyamide or the like, is used as seperator material. These materials are preferably in the form of a nonwoven fabric cloth or micropore structure. A metal-oxide film having fine pores, or a composite resin film including a metal oxide may also be used. Particularly, a metal-oxide film having a multilayer structure is effective for preventing short circuit because dendrite hardly passes therethrough. The use of a fluororesin film, serving as a flame retarding material, glass or a metal-oxide film, serving as an incombustible material, can improve safety.

Electrolyte

The electrolyte in the secondary battery of the present invention is held in a layer having communicating pores through which ions participating in the battery reaction can pass and whose size can be changed in accordance with environment, such as the voltage or the temperature (the polymer film 100 in the case of FIG. 1), and in the separator 103. The electrolyte is used in one of the following three forms.

(1) A method of using it without being modified.

(2) A method of using it in the form of a solution dissolved in a solvent.

(3) A method of using it in a solidified state by adding a gelling agent, such as a polymer or the like in the solution.

In general, an electrolyte liquid obtained by dissolving the electrolyte in a solvent is used in a state of being held in a porous separator.

The conductivity at 25° C. of the electrolyte is preferably $1 \times 10^{-3}$ S/cm, and more preferably, at least $5 \times 10^{-3}$ S/cm.

In lithium batteries using lithium as the anode active material, the following electrolyte and its solvent are preferably used.

As the electrolyte, for example, an acid, such as $H_2SO_4$, HCl, $HNO_3$ or the like, a salt comprising lithium ions ($Li^+$) and Lewis-acid ions ($BF_4^-$, $PF_6^-$, $AsF_6^-$, $ClO_4^-$, $CF_3SO_3^-$, $BPh_4^-$ (Ph: phenyl groups), or a salt obtained by mixing these materials may be used. A salt comprising cations, such as sodium ions, potassium ions, tetraalkylammonium ions or the like, and Lewis-acid ions may also be used. It is desirable that the above-described salts are subjected to sufficient dehydration and deoxidation, for example, by being heated at a reduced pressure.

As the solvent for the electrolyte, for example, acetonitrile, benzonitrile, propylene carbonate, ethylene carbonate, dimethyl carbonate, diethyl carbonate, dimethyl formamide, tetrahydrofuran, nitrobenzene, dichloroethane, diethoxyethane, 1, 2-dimethoxyethane, chlorobenzene, γ-butyrolactone, dioxolane, sulforan, nitromethane, dimethyl sulfide, dimethylsulfoxide, methylformate, 3-methyl-2-oxazolidinone, 2-methyltetrahydrofuran, 3-propylsydonone, sulfur dioxide, phosphoryl chloride, thionyl chloride, sulfuryl chloride, or a mixed solution of at least two of these agents may be used.

It is preferable that the solvent is used after removing water using activated alumina, a molecular sieve, phosphorus pentoxide, calcium chloride or the like, or, for some solvents, after removing impurities and water by being distilled in an inert gas under the coexistence with an alkali metal.

In order to prevent leakage of the electrolyte solution, it is preferable to gel the solution. It is desirable to use a polymer which swells by absorbing the solvent of the electrolyte solution as a gelling agent. Polyethylene oxide, polyvinyl alcohol, polyacrylamide or the like is used as such a polymer.

In nickel-zinc batteries or air-zinc batteries using zinc as the anode active material, the following materials are preferably used. As the electrolyte, for example, an alkali (such as potassium hydroxide, sodium hydroxide, lithium hydroxide or the like) is used.

In bromine-zinc batteries using zinc as the anode active material, a salt, such as zinc bromide or the like, is used.

In order to prevent leakage of the electrolyte solution, it is preferable to perform gelation. As the gelling agent, it is preferable to use a polymer which swells by absorbing the solvent of the electrolyte solution. As such a polymer, for example, polyethylene oxide, polyvinyl alcohol, polyacrylamide or the like, or a starch is used.

The Shape and the Structure of the Battery

The secondary battery of the present invention may specifically have a flat shape (a flat-round shape or a coin-like shape), a cylindrical shape, a prismatic shape, a sheetlike shape or the like. The battery may have a monolayer structure, a multilayer structure, a spiral wound structure or the like. Among these types, spiral cylindrical batteries have the feature that, by inserting the separator between the anode and the cathode and winding the obtained structure, the area of the electrodes can be increased and a large current can be passed during charging/discharging. Batteries having the prismatic shape or the sheetlike shape has the feature that the accommodating space in the device accommodating a plurality of secondary batteries can be effectively utilized.

Figure 3:
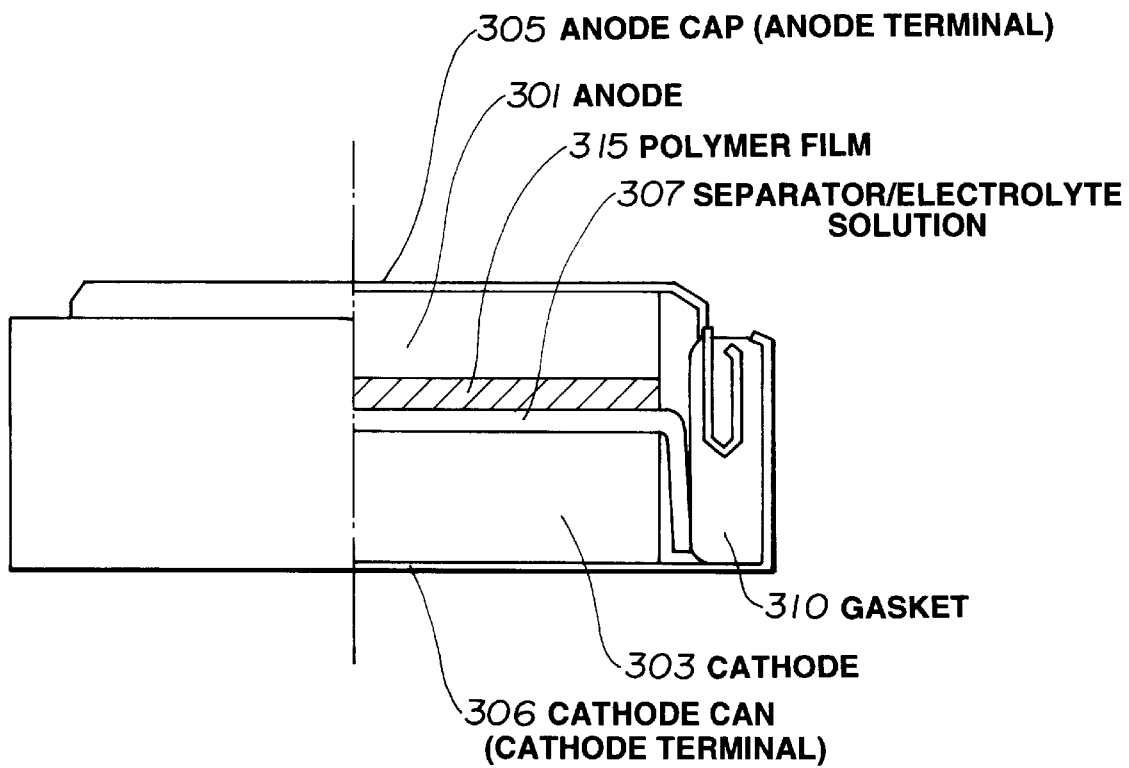
FIG. 3 is a cross-sectional view illustrating the configuration of an example of a monolayer flat battery according to the invention.
Figure 4:
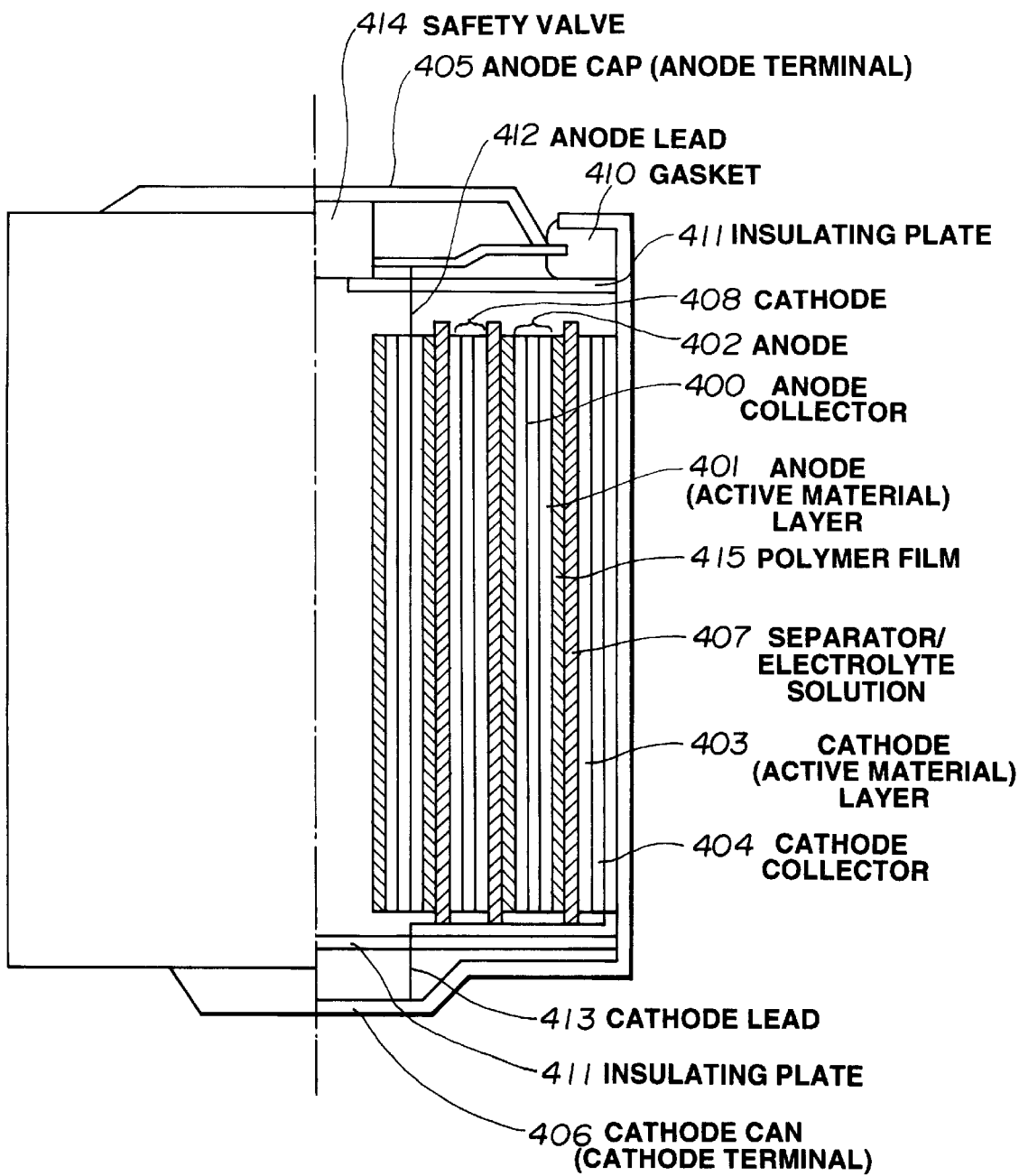
FIG. 4 is a cross-sectional view illustrating the configuration of an example of a spiral cylindrical battery according to the invention.

The shapes and the structures of secondary batteries will now be described in detail with reference to FIGS. 3 and 4. FIG. 3 is a cross-sectional view illustrating the configuration of a monolayer flat-type (flat-round type) battery. FIG. 4 is a cross-sectional view illustrating the configuration of a spiral-type cylindrical battery. These batteries basically have the same configuration as that shown in FIG. 1, and have an anode, a cathode, an electrolyte/separator, a housing and an output terminal.

In FIGS. 3 and 4, there are shown anodes 301 and 402 (the anode 402 comprises an anode collector 400 and an active-material layer 401), cathodes 303 and 408 (the cathode 408 comprises a cathode collector 404 and an active-material layer 403), anode terminals (anode caps) 305 and 405, cathode terminals (cathode cans) 306 and 406, separators/electrolyte solutions 307 and 407, gaskets 310 and 410, an insulating plate 411, an anode lead 412, a cathode lead 413, and a safety valve 414.

In the flat-type (coin-type) secondary battery shown in FIG. 3, the cathode 303, including the cathode-material layer, and the anode 301, including the anode-material layer are laminated via the separator 307 holding at least the electrolyte solution, and a polymer film 315, serving as the above-described layer having communicating pores. This laminated member is accommodated within the cathode can 306, serving as the cathode terminal, from the cathode side, and the anode side is covered with the anode cap 305, serving as the anode terminal. The gasket 310 is disposed at other portions within the cathode can 306.

In the spiral cylindrical secondary battery shown in FIG. 4, the cathode 408, including the cathode (active material) layer 403 formed on the cathode collector 404, and the anode 402, including the anode (active material) layer 401 formed on the anode collector 400 face each other via the separator 407 holding at least the electrolyte solution, and a polymer film 415, serving as the layer having communicating pores, to form a cylindrically-wound laminated member. This cylindrical laminated member is accommodated within the cathode can 406, serving as the cathode terminal. The anode cap 405, serving as the anode terminal, is provided at the opening side of the cathode can 406, and the gasket 410 is disposed at other portions within the cathode can 406. The laminated member of the cylindrical electrodes is separated from the inside of anode cap and cathode can via the insulating plate 411. The cathode 408 is connected to the cathode can 406 via a cathode lead 413. The anode 402 is connected to the anode cap 405 via an anode lead 412. A safety valve 414 for adjusting the inner pressure within the battery is provided.

A description will now be provided of a method for assembling the batteries shown in FIGS. 3 and 4.

(1) The separator (307, 407) is inserted between the anode layer (301, 401) coated with the polymer film (315, 415), and the formed cathode layer (303, 403), and the obtained member is incorporated within the cathode can (306, 406).

(2) After injecting the electrolyte solution, the anode cap (305, 405) and the gasket (310, 410) are assembled.

(3) The battery is completed by calking the members assembled in process (2).

It is desirable that the preparation of materials and the assembling of the lithium battery are performed in a dry air where water is sufficiently removed, or in a dry inert gas.

A description will now be provided of the components in the above-described secondary batteries.

Gasket

As the material for the gasket (310, 410), for example, a polyolefin resin, a fluororesin, a polyamide resin, a polysulfon resin, or each kind of rubber may be used. The battery may be sealed using glass sealing, adhesion by using an adhesive, welding, soldering or the like, in addition to the above-described calking using the gasket as shown in FIGS. 3 and 4.

As the material for the insulating plate 411 shown in FIG. 4, each kind of organic-resin material, or ceramic is used.

Battery Housing/Cathode Can, Anode Cap

As the battery housing for accommodating the respective components in the secondary battery of the present invention, for example, the cathode can and the anode cap also have the role of respective electrode terminals of the battery, as shown in FIGS. 3 and 4. In the case of FIGS. 3 and 4, the cathode cans 306 and 406 and the anode caps 305 and 405, respectively, are used as the battery housings also having the role of input/output terminals. As the material for the battery housing also having the role of input/output terminals, stainless steel is preferably used. Particularly, a titanium-clad stainless-steel plate, a copper-clad stainless-steel plate, a nickel-plated steel plate or the like is frequently used.

Particularly in the cases of FIGS. 3 and 4, since each of the cathode cans 306 and 406 also has the role of the battery housing, stainless steel is preferably used.

On the other hand, when the cathode can and the like does not have the role of the battery housing, a metal, such as zinc or the like, a plastic, such as polypropylene or the like, or a composite material comprising a metal or glass fibers and plastic is used in addition to stainless steel as the material for the battery housing.

Safety Valve

It is preferable that the secondary battery of the present invention includes, for example, the safety valve 414 shown in FIG. 4 as safety means when the inner pressure of the battery increases. For example, rubber, a spring, a metallic ball, a rupture foil or the like may be used as the safety valve.

The present invention will now be described in detail with reference to embodiments. However, the present invention is not limited to the following embodiments.

EXAMPLE 1

In the present invention, coin-shaped lithium secondary batteries having a cross section as shown in FIG. 3 were manufactured. An anode whose surface is coated with a polymer-liquid crystal composite film for preventing internal short circuit due to the growth of dendritic lithium during charging was used.

A description will now be provided of procedures for manufacturing respective components of the battery and assembling of batteries. All operations were performed in argon gas.

(1) Procedures for Manufacturing the Anode (Active-Material) Layer 301

The anode layer 301 was formed by cladding a metallic lithium foil on a copper expanded metal.

(2) Coverage of the Anode by a Polymer-Liquid Crystal Composite Film

1) Polyvinyl chloride and a liquid crystal ZLI4519 made by Merck Corporation having negative dielectric-constant anisotropy were mixed at a weight ratio of 40/60. Then, dichloroethane was added to prepare a coating solution.

2) The coating solution prepared in process 1) was coated on the surface of the metallic lithium foil cladded on the copper expanded metal formed in process (1). The coated film was dried while applying a magnetic field in a direction perpendicular to the surface of the metallic lithium foil, and was then subjected cross-linking by irradiating ultraviolet rays. Thus, the anode (active-material) layer 301 made of the metallic lithium foil coated with the polymer film 315 in which the liquid crystal is dispersed was obtained.

(3) Procedures for Manufacturing the Cathode (Active-Material) Layer 303

1) Electrolytic manganese dioxide and lithium carbonate were mixed at a molar ratio of 1:0.4. The obtained mixture was heated at 800° C. to prepare a lithium-manganese oxide.

2) After mixing 3 weight % of acetylene-black carbon powder and 5 weight % of polyvinylidenefluoride powder in the lithium-manganese oxide prepared in process 1), N-methyl-2-pyrolidone was added.

3) After coating the paste obtained in process 2) on an aluminum foil and drying the coated film, the film was dried at 150° C. at a reduced pressure to prepare the cathode (active-material) layer 303.

(4) Procedures for Manufacturing the Electrolyte Solution 307

1) Ethylene carbonate (EC) and dimethyl carbonate (DMC) of an equal amount from which water was sufficiently removed were mixed to prepare a solvent.

2) An electrolyte solution obtained by dissolving 1M (mol/l) of lithium tetrafluoroborate in the solvent obtained in process 1) was used.

(5) Separator 307

Using a micro-porous polyethylene film as a separator, the elecrolyte solution preapared in process (4) was held.

(6) Assembling of the Battery

1) The separator 307 holding the electrolyte solution was inserted between the anode layer 301 coated with the polymer film 315, and the cathode layer 303, and the resultant member was incorporated into the cathode can 306 made of a titanium-clad stainless-steel material. The electrolyte solution is injected into the cathode can 306, thereby having the polymer film 315 held the solution.

2) The gasket 310 made of polypropylene and the anode cap 305 made of a titanium-clad stainless-steel material were placed and caulked on the cathode can 306 obtained in process 1) to prepare a lithium secondary battery.

(Evaluation of Battery Characteristics)

The evaluation of the performance of the prepared batteries will now be described. The performance of the obtained secondary batteries was evaluated with respect to the energy density per unit volume and the cycle life of the battery obtained in a charging/discharging cycle test.

The cycle test was performed under the condition that a cycle comprises charging/discharging at a sufficiently large current density to facilitate the growth of dendrite of the anode active material during charging based on the capacity calculated from the cathode active material, i.e., 1 C (a current equal to capacity/time) and an interval of 30 minutes. The charging/discharging test of the battery was performed using HJ-106M made by Hokuto Denko Kabushiki Kaisha. The charging/discharging test was started from charging. The discharge capacity at the third cycle was defined as the battery capacity, and the number of cycles where the discharge capacity becomes less than 60% of the battery capacity was defined as the cycle life. The energy density per unit volume (Wh/l) was evaluated by a value of (an average operating voltage (V)×a discharging amount (Ah)/the volume of the battery (l). The volume of the battery was calculated as the outer volume of a unit cell comprising an anode/a separator/a cathode. In the case of a lithium battery, the cut-off voltage at charging was set to 4.5 V, and the cut-off voltage at discharging was set to 2.5 V.

COMPARATIVE EXAMPLE 1

Comparative Example 1 differs from Example 1 in that an anode (active-material) layer which is not coated with a polymer-liquid crystal composite film was used for the anode. That is, in this example, the operation of coating a polymer/liquid crystal composite film performed in Example 1 was not performed.

Batteries were manufactured and evaluated in the same manner as in Example 1 in other items.

Table 1 shows the results of the evaluation of the performance (the cycle life) for the lithium secondary batteries manufactured in Example 1 and Comparative Example 1. The results of the evaluation of the cycle life are indicated by normalizing the value of Example 1 with the value of Comparative Example 1.

TABLE 1

|  | Example 1 | Comparative Example 1 |
|---|---|---|
| Cycle life | 1.4 | 1.0 |

Besides, batteries otained in Example 1 and Comparative Example 1 were subjected to 10 cycles of the above charging/discharging test. After the above test, the housing of each of the above batteries was opened, and the state of dendritic deposition in the anode of the battery was observed by a microscope. In the battery of Example 1, dendritic deposition in the anode was not observed. In the battery of Comparative Example 1, dendritic deposition in the anode was observed.

Accordingly, it has become clear that a long cycle life is obtained without dendritic deposition in the anode in the secondary battery, in which the anode is coated with the polymer/liquid crystal composite film, of Example 1.

EXAMPLE 2

In this example, coin-shaped lithium secondary batteries having a cross section as shown in FIG. 3 were manufactured. Example 2 differs from Example 1 in that an aluminum foil coated with a polymer/liquid crystal film was used as the anode, and that lithium-nickel oxide was used as the cathode active material. Secondary batteries were manufactured in the same manner as in Example 1 in other processes.

Procedures for manufacturing the anode and the cathode of the battery will now be described with reference to FIG. 3.

(1) Procedures for Manufacturing the Anode

1) The surface of an aluminum foil was etched by an aqueous solution of 5 weight % of potassium hydroxide. The solution was then neutralized by an aqueous solution of nitric acid, and the aluminum foil was washed in water. Then, the aluminum foil was subjected to electrolytic etching using an aqueous solution of hydrochloric acid as the electrolyte solution and glassy carbon as the facing electrode. The aluminum foil was then washed in water and dried at a reduced pressure, to prepare an aluminum foil having an increased surface area.

Lithium, serving as the anode active material, is deposited on the surface of the aluminum foil during charging in the battery to form an anode-active-material layer.

(2) Coverage of the Anode with a Polymer/Liquid Crystal Film

1) Azobisisobutyronitrile was added to a tetrahydrofuran solution, in which a poly (4,4'-dioxy-2,2'-dimethylazoxybenzene (+3)-methylhexane diol) cholesteric polymer liquid crystal and 2 weight % of lithium fluoroboride were mixed, to prepare a coating liquid.

2) The coating liquid prepared in process 1) was coated on the surface of the aluminum foil manufactured in process (1) using a spin coater. The coated film was heated at 100° C. under reduced pressure to prepare an aluminum-foil anode coated with a polymer liquid crystal film.

(3) Procedures for Manufacturing the Cathode-Active-Material Layer 303

1) Lithium nitrate and nickel carbonate were mixed at a molar ratio of 1:1. The obtained mixture was heated at 750° C. in an air flow, to prepare a lithium-nickel oxide.

2) After mixing 3 weight % of acetylene-black carbon powder and 5 weight % of polyvinylidenefluoride powder in the lithium-nickel oxide prepared in process 1), N-methyl-2-pyrolidone was added.

3) After coating the paste obtained in process 2) on an aluminum foil and drying the coated film, the film was dried at 150° C. under reduced pressure to prepare the cathode-active-material layer 303.

The batteries were manufactured in the same manner as in Example 1 in other processes.

COMPARATIVE EXAMPLE 2

Comparative Example 2 differs from Example 2 in that an anode which is not coated with a polymer liquid crystal film was used for the anode. That is, in this example, the operation of coating a polymer liquid crystal film performed in Example 2 was hot performed.

Batteries were manufactured and evaluated in the same manner as in Example 2 in other items.

Table 2 shows the results of the evaluation of the performance (the cycle life) for the lithium secondary batteries manufactured in Example 2 and Comparative Example 2. The results of the evaluation of the cycle life are indicated by normalizing the value of Example 2 with the value of Comparative Example 2.

TABLE 2

|  | Example 2 | Comparative Example 2 |
|---|---|---|
| Cycle life | 1.6 | 1.0 |

Accordingly, it has become clear that the cycle life is lengthened in the secondary battery, in which the anode is coated with the polymer liquid crystal film, of Embodiment 2.

EXAMPLE 3

In this example, coin-shaped lithium secondary batteries having a cross section as shown in FIG. 3 were manufactured. Example 3 differs from Example 1 in that graphite which intercalates lithium between its layers during charging is used as the anode, lithium-cobalt oxide was used as the cathode active material, and a polymer gel film was provided between the anode and the cathode. Secondary batteries were manufactured in the same manner as in Example 1 in other processes.

Procedures for manufacturing the anode and the cathode of the battery will now be described with reference to FIG. 3.

(1) Procedures for Manufacturing the Polymer Gel Film

1) A polypropylene film having fine pores subjected to hydrophilic processing was immersed in an aqueous solution of N,N-diethylacrylamide deoxidized by flowing nitrogen gas, which is a monomer for a polymer, and sodium acrylate, and was irradiated with a gamma-ray and was then washed by water. After removing the unreacted mononer, the solution was dried under reduced pressure to obtain a fine-pore polypropylene film having a polymer gel.

(2) Procedures for Manufacturing the Anode

1) After mixing 5 weight % of polyvinylidene fluoride powder with natural graphite fine particles subjected to heat treatment at 2,000° C. in an argon gas flow, N-methyl-2-pyrolidone was added to prepare a paste.

2) After coating the paste obtained in process 1) on a copper foil and drying the coated layer, the coated layer was dried at 150° C. under reduced pressure to provide an anode.

During charging, lithium is intercalated in the graphite to form the anode (active-material layer) 301.

(3) Procedures for Manufacturing the Cathode (Active-Material Layer) 303

1) Lithium carbonate and cobalt carbonate were mixed at a molar ratio of 1:2. The obtained mixture was heated at 800° C. in an air flow to prepare a lithium-cobalt oxide.

2) After mixing 3 weight % of acetylene-black carbon powder and 5 weight % of polyvinylidenefluoride powder in the lithium-cobalt oxide prepared in process 1), N-methyl-2-pyrolidone was added.

3) After coating the paste obtained in process 2) on a collector comprising an aluminum foil in the form of an expanded metal and drying the coated film, the film was dried at 150° C. under reduced pressure to provide the cathode 303.

(4) Assembling of Batteries

1) The fine-pore polypropylene films having the polymer gel manufactured in the above-described process (1) holding the electrolyte solution were inserted at the anode side and the cathode side, respectively, between the anode(active-material layer) 301 and the cathode (active-material layer) 303, as in the lamination structure shown in FIG. 2(c) which comprises the cathode 102, the polymer film 100, the electrolyte solution and the anode 101, and the resultant member was incorporated into the cathode can 306 made of a titanium-clad stainless-steel material.

2) The gasket 310 made of polypropylene and the anode cap 305 made of a titanium-clad stainless-steel material were placed and caulked on the cathode can 306 obtained in process 1) to provide a lithium secondary battery.

The performance of the obtained secondary batteries was evaluated in the same manner as in Example 1.

COMPARATIVE EXAMPLE 3

Comparative Example 3 differs from Example 3 in that the polymer gel film was not used between the cathode and the anode. The fine-pore polypropylene film without the polymer gel was used for a separator. Batteries were manufactured in the same manner as in Example 3 in other processes.

Table 3 shows the results of the evaluation of the performance (the cycle life) for the lithium secondary batteries manufactured in Example 3 and Comparative Example 3. The results of the evaluation of the cycle life are indicated by normalizing the value of Example 3 with the value of Comparative Example 3.

TABLE 3

|  | Example 3 | Comparative Example 3 |
|---|---|---|
| Cycle life | 1.3 | 1.0 |

Accordingly, it has become clear that the cycle life is improved in the lithium secondary battery, in which the polymer gel film is inserted between the cathode and the anode, of Example 3.

The values of the energy density per unit volume of the secondary batteries of Examples 1, 2 and 3 normalized by making the energy density per unit volume of the secondary battery of Comparative Example 3 to be 1.0 are 1.9, 1.6 and 1.0, respectively.

The results of comparison of the energy density indicate that the secondary batteries of the Examples 1, 2 and 3 have long cycle lifes and can have higher energy densities than the batteries using graphite as the anode.

In Examples 1, 2 and 3, lithium-cobalt oxide, lithium-nickel oxide and lithium-manganese oxide are used, respectively, as the cathode active material in the lithium secondary battery. However, the present invention is not limited to these materials, but various kinds of cathode active materials, such as lithium-vanadium oxides, lithium-iron oxides and the like, may also be adopted. Although in the above-described examples, metallic lithium, aluminum and graphite are used as the anode material, the present invention is not limited to these materials, but various kinds of carbonous materials obtained by baking organic resins, transition-metal oxides, transition-metal sulfides and the like may also be adopted.

Although only one kind of electrolyte solution is used for Examples 1, 2 and 3, the present invention is not limited to this solution.

EXAMPLE 4

In this example, coin-shaped nickel-zinc secondary batteries having a cross-section as shown in FIG. 3 were manufactured.

Procedures for manufacturing the respective components of the battery and assembly of the battery will now be described with reference to FIG. 3.

(1) Procedures for Manufacturing the Polymer Gel Film 315

1) Acrylamide and trimethyl (N-acryloyl-3-aminopropyl) ammonium iodide, which are monomers for polymers, and N,N'-methylene bisacrylamide, serving as a cross-linking agent, were dissolved in water and were then deoxidized by flowing nitrogen gas. A polypropylene film having fine pores subjected to hydrophilic processing was immersed in the solution. Ammonium persulfate, serving as a polymerization starting agent, and tetramethylethylene diamine were added to the solution, and reaction was effected for about 30 minutes to obtain a gel, which was then washed by water. After removing the unreacted mononer, the gel was dried under reduced pressure to obtain a fine-pore polypropylene film having a polymer gel.

(2) Procedures for Manufacturing the Anode (Active-Material) Layer 301

1) A paste prepared by adding polyvinyl alcohol, serving as a binder, to a mixture of zinc powder and zinc oxide powder, knealing the resultant mixture by adding water was coated on both surfaces of a copper punching metal, and the coated layer was dried and subjected to press forming to obtain the anode (active-material) layer 301.

(3) Procedures for Manufacturing the Cathode (Active-Material Layer) 303

1) A paste was prepared by adding nickel powder to nickel hydroxide, adding carboxymethyl cellulose, serving as a binder, and water. The paste was filled in a nickel foamed member (Celmet/trade name, foamed material made by Sumitomo Electric Industries, Ltd.), and was dried and pressed to obtain the cathode (active-material layer) 303.

(4) Precedures for Manufacturing the Electrolyte Solution 307

1) An aqueous solution of 30 weight % of potassium hydroxide to which lithium hydroxide was added was used.

(5) Separator 307

1) A separator 100 μm thick prepared by sandwiching a polypropylene nonwoven fabric cloth subjected to hydrophilic treatment by polypropylene films having fine pores subjected to hydrophilic treatment was used.

(6) Assembling of Batteries

1) The fine-pore polypropylene film having the polymer gel manufactured in the above-described process (1) and the separator 307 holding the electrolyte solution was inserted at the anode side and cathode side, respectively, between the anode (active-material layer) 301 and the cathode (active-material layer) 303, as in the lamination structure shown in FIG. 2(a) which comprises the cathode 102, the separator/electrolyte solution 103, the polymer film 100 and the anode 101, and the resultant member was incorporated into the cathode can 306 made of a titanium-clad stainless-steel material. The electrolyte solution is injected into the cathode can 306, thereby having the polypropylene film held the solution.

2) The gasket 310 made of polypropylene and the anode cap 305 made of a titanium-clad stainless-steel material were placed and caulked on the cathode can 306 obtained in process 1) to provide a nickel-zinc secondary battery.

The evaluation of the performance of the prepared batteries will now be described. The performance of the obtained secondary batteries was evaluated with respect to the cycle life of the battery obtained in a charging/discharging cycle test.

The cycle test was performed under the condition that a cycle comprises charging/discharging at 1 C (a current equal to capacity/time) based on the capacity calculated from the cathode active material, and an interval of 30 minutes. The charging/discharging test of the battery was performed using HJ-106M made by Hokuto Denko Kabushiki Kaisha. The charging/discharging test was started from charging. The discharge capacity at the third cycle was defined as the battery capacity, and the number of cycles where the discharge capacity becomes less than 60% of the battery capacity was defined as the cycle life. In the case of a nickel-zinc battery, the cut-off voltage at charging was set to 2.0 V, and the cut-off voltage at discharging was set to 0.9 V.

COMPARATIVE EXAMPLE 4

Comparative Example 4 differs from Example 4 in that the polymer gel film was not used. Nickel-zinc secondary batteries were manufactured and the performance of the batteries was evaluated in the same manner as in Example 4 in other items.

Table 4 shows the results of the evaluation of the performance (the cycle life) for the nickel-zinc secondary batteries manufactured in Example 4 and Comparative Example 4. The results of the evaluation of the cycle life are indicated by normalizing the value of Example 4 with the value of Comparative Example 4.

TABLE 4

|  | Example 4 | Comparative Example 4 |
| --- | --- | --- |
| Cycle life | 1.5 | 1.0 |

Accordingly, it has become clear that a longer cycle life can be obtained in the nickel-zinc secondary battery, in which the polymer gel film is inserted between the cathode and the anode, of Example 4.

EXAMPLE 5

In the present example, coin-shaped air-zinc secondary batteries having a cross section as shown in FIG. 3 were manufactured.

A description will now be provided of procedures for manufacturing the respective components of the battery and assembly of the battery with reference to FIG. 3.

(1) Procedures for Manufacturing the Polymer-Liquid Crystal Composite Film 315

1) Polyvinyl chloride and a liquid crystal ZLI-2806 made of Merck Corporation having negative dielectric-constant anisotropy were mixed at a weight ratio of 40/60, and the obtained mixture was dissolved in dichloroethane. The solution was coated on a fine-pore polypropylene film subjected to hydrophilic processing on which an ethanol solution of lecithin was coated and dried in advance, to obtain the polymer-liquid crystal composite film 315.

(2) Procedures for Manufacturing the Anode (Active-Material) Layer 301

1) A paste prepared by adding polyvinyl alcohol and water to a mixture of zinc powder and zinc oxide powder and kneading the resultant liquid was coated on both surfaces of a copper punching metal and the coated film was dried and pressed to obtain the anode (active-material layer) 301.

(3) Procedures for Manufacturing the Cathode

1) A paste otained by mixing manganese dioxide, nickel oxide, cobalt oxide and tetrafluoroethylene polymer powder, and adding a xylene solution of 5 weight % of Super KONAC F (a powder fluororesin paint made by Nippon Oil and Fats Co., Ltd.) thereto was coated on a nickel-plated copper mesh and cured at 170° C., and was then formed by being passed through a pressure heater roller, to obtain the cathode.

Air is diffused in the cathode during discharging, and oxygen, serving as an active material, reacts on the cathode.

(4) Procedures for Manufacturing the Electrolyte Solution 307

1) An aqueous solution of 30 weight % of potassium hydroxide to which lithium hydroxide was added was used.

(5) Separator 307

1) A separator 100 $\mu$m thick prepared by sandwiching a polypropylene nonwoven fabric cloth subjected to hydrophilic treatment by polypropylene films having fine pores subjected to hydrophilic treatment was used.

(6) Assembling of Batteries

1) The fine-pore polypropylene film having the polymer-liquid crystal composite film manufactured in the above-described process (1) and the separator 307 holding the electrolyte solution was inserted at the anode side and the cathode side, respectively, between the anode (active-material layer) 301 and the cathode (active-material layer) 303, as in the lamination structure shown in FIG. 2(a) which comprises the cathode 102, the separator/electrolyte solution 103, the polymer film 100 and the anode 101, and the resultant member was incorporated into the cathode can 306, having an air intake hole, made of a titanium-clad stainless-steel material in which air-diffusing paper and a polytetrafluoroethylene film were incorporated in advance. The electrolyte solution is injected into the cathode can 306, thereby having the polypropylene film held the solution.

2) The insulating packing 310 made of polypropylene and the anode cap 305 made of a titanium-clad stainless-steel material were placed and caulked on the cathode can 306 obtained in process 1) to provide an air-zinc secondary battery.

COMPARATIVE EXAMPLE 5

Comparative Example 5 differs from Example 5 in that the polymer-liquid crystal composite film was not used in the cathode and the anode. Air-zinc secondary batteries were manufactured in the same manner as in Example 5 in other processes.

The performance of the batteries manufactured in Example 5 and Comparative Example 5 was evaluated under the same condititions as in the nickel-zinc secondary batteries of Example 4.

Table 5 shows the results of the evaluation of the performance of the cycle life for the air-zinc secondary batteries manufactured in Example 5 and Comparative Example 5. The results of the evaluation of the cycle life are indicated by normalizing the value of Example 5 with the value of Comparative Example 5.

TABLE 5

|  | Example 5 | Comparative Example 5 |
| --- | --- | --- |
| Cycle life | 1.3 | 1.0 |

Accordingly, it has become clear that a longer cycle life can be obtained by adopting the air-zinc secondary battery, in which the polymer-liquid crystal composite film is provided between the cathode and the anode, of Example 5.

As described above, according to the present invention, particularly in the secondary battery in which the anode active material comprises lithium or zinc, the growth of dendrite at the anode during charging causing degradation of the performance can be suppressed. As a result, it is possible to provide lithium secondary batteries, nickel-zinc secondary batteries, air-zinc secondary batteries and the like having a long cycle life and a high energy density.

The individual components shown in outline in the drawings are all well known in the secondary battery arts and their specific construction and operation are not critical to the the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A secondary battery comprising:
    an anode;
    a cathode;
    an electrolyte;
    a polymer film layer which comprises at least one of (a) a liquid crystal polymer, (b) a composite of polymer and liquid crystal or (c) a polymer gel and which includes communicating pores through which ions participating in a battery reaction can move between the anode and the cathode, wherein said communicating pores change in size in accordance with changes in the intensity of an electric field and/or a temperature in a region surrounding said communicating pores, said electrolyte and said layer being disposed between said anode and said cathode; and
    a battery housing.

2. A secondary battery according to claim 1, wherein the sizes of said communicating pores decrease when an increase in the intensity of the electric field and/or the temperature in the region surrounding said communicating pores occurs.

3. A secondary battery according to claim 1, wherein said polymer liquid crystal is oriented perpendicularly or obliquely relative to the plane of said anode when no electric field is applied, and is oriented substantially in parallel or randomly relative to the plane of said anode in the vicinity of said pores where an increase in the intensity of the electric field and/or the temperature occurs.

4. A secondary battery according to claim 1, wherein said polymer liquid crystal has negative dielectric-constant anisotropy.

5. A secondary battery according to claim 1, wherein said liquid crystal in said polymer film is oriented perpendicularly or obliquely relative to the plane of said anode when no electric field is applied, and is oriented substantially in parallel or randomly relative the plane of said anode in the vicinity of said pores where an increase in the intensity of the electric field and/or the temperature occurs.

6. A secondary battery according to claim 1, wherein said liquid crystal in said polymer film has negative dielectric-constant anisotropy.

7. A secondary battery according to claim 1, wherein in said polymer gel, volume expansion of at least 20% occurs due to temperature rise.

8. A secondary battery according to claim 1, further comprising a separator, wherein said cathode, said separator, said polymer film and said anode are laminated in this order to form a lamination structure.

9. A secondary battery according to claim 8, wherein said polymer film comprises a cationic polymer gel having positive charges.

10. A secondary battery according to claim 1, further comprising a separator, wherein said cathode, said polymer film, said separator and said anode are laminated in this order to form a lamination structure.

11. A secondary battery according to claim 10, wherein sid polymer film comprises an anionic polymer gel having negative charges.

12. A secondary battery according to claim 1, wherein said polymer film also operates as a separator and is held between said cathode and said anode.

13. A secondary battery according to claim 1, wherein said polymer film has pores each diameter being 2–1,000 Å.

14. A secondary battery according to claim 1, wherein the ratio of contraction of the diameters of the pores in said polymer film is 20–98% when a high electric field is locally applied or the temperature locally rises.

15. A secondary battery according to claim 1, wherein said anode during charging of said secondary battery contains at least a lithium element.

16. A secondary battery according to claim 1, wherein said anode during charging of said secondary battery contains at least a zinc element.

* * * * *

UNITED STATES PATENT AND TRADEMARK OFFICE
CERTIFICATE OF CORRECTION

PATENT NO.  : 5,888,666

DATED       : March 3, 1997

INVENTOR(S) : SOICHIRO KAWAKAMI

It is certified that error appears in the above-identified patent and that said Letters Patent is hereby corrected as shown below:

COLUMN 1

Line 23, "where" should read --when-- and "large to" should read --large in order to--; and
    Line 47, "with" should be deleted.

COLUMN 2

Line 65, "in or" should read --in, or--.

COLUMN 9

Line 3, "cholestric" should read --cholesteric--; and
    Line 6, "pallel" should read "parallel--.

COLUMN 10

Line 16, "are" should read --is--;
    Line 24, "are" should read --is--; and
    Line 34, "are" should read --is--.

COLUMN 11

Line 65, "an" should be deleted.

UNITED STATES PATENT AND TRADEMARK OFFICE
CERTIFICATE OF CORRECTION

PATENT NO.   : 5,888,666

DATED        : March 3, 1997

INVENTOR(S)  : SOICHIRO KAWAKAMI

It is certified that error appears in the above-identified patent and that said Letters Patent is hereby corrected as shown below:

COLUMN 12

Line 8, "an" should be deleted.

COLUMN 18

Line 60, "mononer," should read --monomer,--.

COLUMN 20

Line 39, "mononer," should read --monomer,--; and
    Line 61, "hydroxide to" should read --hydroxide, to-- and "added was" should read --added, was---.

COLUMN 22

Line 21, "otained" should read --obtained--; and
    Line 55, "held" should read --hold--.

UNITED STATES PATENT AND TRADEMARK OFFICE
CERTIFICATE OF CORRECTION

PATENT NO. : 5,888,666

DATED : March 3, 1997

INVENTOR(S) : SOICHIRO KAWAKAMI

It is certified that error appears in the above-identified patent and that said Letters Patent is hereby corrected as shown below:

<u>COLUMN 24</u>

Line 42, "sid" should read --said--.

Signed and Sealed this

Fourteenth Day of December, 1999

Attest:

Q. TODD DICKINSON

Attesting Officer

Acting Commissioner of Patents and Trademarks